(12) United States Patent
Gohshi

(10) Patent No.: US 8,687,852 B2
(45) Date of Patent: Apr. 1, 2014

(54) MOTION DETECTION DEVICE, CONTROL PROGRAM, AND INTEGRATED CIRCUIT

(75) Inventor: Seiichi Gohshi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/577,705

(22) PCT Filed: Nov. 8, 2010

(86) PCT No.: PCT/JP2010/069839
§ 371 (c)(1),
(2), (4) Date: Aug. 8, 2012

(87) PCT Pub. No.: WO2011/099201
PCT Pub. Date: Aug. 18, 2011

(65) Prior Publication Data
US 2012/0308085 A1 Dec. 6, 2012

(30) Foreign Application Priority Data
Feb. 15, 2010 (JP) .................... 2010-030576

(51) Int. Cl.
*G06K 9/00* (2006.01)
(52) U.S. Cl.
USPC .......................................... 382/107
(58) Field of Classification Search
None
See application file for complete search history.

(56) References Cited

U.S. PATENT DOCUMENTS

| 6,008,866 | A | 12/1999 | Komatsu | |
|---|---|---|---|---|
| 6,295,322 | B1 * | 9/2001 | Arbeiter et al. | 375/240.29 |
| 6,377,313 | B1 * | 4/2002 | Yang et al. | 348/630 |
| 6,459,734 | B1 * | 10/2002 | Kato et al. | 375/240.12 |
| 6,687,300 | B1 * | 2/2004 | Fujita et al. | 375/240.16 |
| 7,262,818 | B2 * | 8/2007 | Chuang et al. | 348/790 |
| 7,302,112 | B2 * | 11/2007 | Shimazaki et al. | 382/266 |
| 7,925,054 | B2 * | 4/2011 | Ishii | 382/107 |
| 2005/0162566 | A1 * | 7/2005 | Chuang et al. | 348/714 |

(Continued)

FOREIGN PATENT DOCUMENTS

| EP | 0 991 016 A2 | 4/2000 |
|---|---|---|
| JP | 05-316497 A | 11/1993 |

(Continued)

OTHER PUBLICATIONS

Official Communication issued in International Patent Application No. PCT/JP2010/069839, mailed on Dec. 28, 2010.

*Primary Examiner* — Nancy Bitar
(74) *Attorney, Agent, or Firm* — Keating & Bennett, LLP

(57) ABSTRACT

A motion detection device (200) receives a signal indicative of a moving image and detects motion between frames with respect to each block region consisting of one or a plurality of adjacent pixels constituting each frame constituting the moving image, and includes: a difference calculation section (220) for obtaining a difference signal (S220) indicative of a difference between adjacent two frames; a first edge detection section (230) for obtaining, with respect to each block region, a first edge signal (S230) included in one of the two frames; a second edge detection section (240) for obtaining, with respect to each block region, a second edge signal (S240) included in the other of the two frames; an edge calculation section (250) for obtaining, with respect to each block region, an edge signal (S250) by adding a product of the first edge signal (S230) and a first coefficient to a product of the second edge signal (S240) and a second coefficient; and a division section (260) for obtaining, with respect to each block region, a motion signal (S260) by dividing the difference signal (S220) by the edge signal (S250).

7 Claims, 5 Drawing Sheets

(56) References Cited

U.S. PATENT DOCUMENTS

| | | | |
|---|---|---|---|
| 2007/0269137 A1* | 11/2007 | Ida et al. | 382/299 |
| 2008/0050032 A1* | 2/2008 | Okuno et al. | 382/266 |
| 2011/0279730 A1* | 11/2011 | Goshi | 348/627 |
| 2012/0070098 A1 | 3/2012 | Gohshi | |
| 2012/0081198 A1 | 4/2012 | Gohshi | |

FOREIGN PATENT DOCUMENTS

| | | |
|---|---|---|
| JP | 06-141288 A | 5/1994 |
| JP | 09-168136 A | 6/1997 |
| JP | 10-108039 A | 4/1998 |
| WO | 2011/061957 A1 | 5/2011 |
| WO | 2011/061958 A1 | 5/2011 |

* cited by examiner

MOTION DETECTION DEVICE, CONTROL PROGRAM, AND INTEGRATED CIRCUIT

TECHNICAL FIELD

The present invention relates to a motion detection device etc. which detects a motion region in a moving image.

BACKGROUND ART

Conventionally, techniques for detecting a motion region in a moving image have been widely used. An example of such techniques is a process carried out by an image processing device etc. for detecting a motion region where blurring is likely to appear and sharpening an image at the detected motion region, thereby improving the image quality of a moving image.

Patent Literature 1 discloses a technique relating to detection of a motion region. The technique is such that when noises exist on a transmission channel, characteristics of detection of a motion region are changed depending on the level of the noises so as to prevent wrong detection of a motion region.

With reference to FIG. 4, the following explains a circuit for detecting a motion region (hereinafter referred to as a conventional motion detection circuit) disclosed in Patent Literature 1. FIG. 4 is a block diagram showing a configuration of the conventional motion detection circuit. With the configuration shown in the drawing, the conventional motion detection circuit detects a motion region in a moving image with respect to each block region. The block region is a region consisting of one or a plurality of adjacent pixels.

As shown in the drawing, the conventional motion detection circuit includes a frame memory 910, a frame difference calculation section 920, an edge detection section 930, and a division section 960.

The frame memory 910 retains an input signal with respect to each frame, and outputs the retained signal with respect to each frame. Consequently, the signal outputted from the frame memory 910 indicates a frame immediately before the current frame.

The frame difference calculation section 920 calculates a frame difference between the current frame and a frame which is outputted from the frame memory 910 and which is immediately before the current frame. On the other hand, the edge detection section 930 detects, with respect to each block region, a high frequency component which is an edge component in the current frame.

Then, the division section 960 divides the frame difference calculated by the frame difference calculation section 920 by the absolute value of the high frequency component detected by the edge detection section 930, thereby obtaining a motion amount with respect to each block region.

CITATION LIST

Patent Literature

[Patent Literature 1]
Japanese Patent Application Publication, Tokukaihei, No. 9-168136 (published on Jun. 24, 1997)

SUMMARY OF INVENTION

Technical Problem

Here, with reference to FIG. 5, an explanation is made as to a signal processed in the conventional motion detection circuit. (a) of FIG. 5 is a schematic view showing a waveform in an M-th frame. (b) of FIG. 5 is a schematic view showing a waveform in an M+1-th frame. M may be any integer. It is assumed that a predetermined object moves in a screen at a constant speed without changing its shape from the M-th frame shown in (a) of FIG. 5 to the M+1-th frame shown in (b) of FIG. 5.

(c) of FIG. 5 is a schematic view showing a difference (frame difference) between the signal shown in (a) of FIG. 5 and the signal shown in (b) of FIG. 5, which difference is calculated by the frame difference calculation section 920.

(d) of FIG. 5 is a schematic view showing a waveform obtained by the division section 960 dividing the frame difference shown in (c) of FIG. 5 by the absolute value of an edge component of the frame shown in (b) of FIG. 5.

Here, in the signal indicative of the frame difference shown in (c) of FIG. 5, a portion resulting from the signal in the M+1-th frame (signal in a zone from B to C in the drawing) has s smaller signal value by the division, whereas a portion resulting from the signal in the M-th frame (signal in a zone from A to B in the drawing) does not have a smaller signal value by the division because the portion does not have an edge component in the M+1-th frame. Consequently, as a result of the division, there exist both the portion with a large signal value and the portion with a small signal value as shown in (d) of FIG. 5. That is, although an identical predetermined object moves, the signal indicative of the frame difference has a difference between the portion with a large signal value and the portion with the small signal value.

Here, the motion amount of a predetermined object in the M-th frame is equal to the motion amount of the predetermined object in the M+1-th frame. Accordingly, unless in regard to a motion signal S260, a portion resulting from the signal in the M-th frame has substantially the same shape as a portion resulting from the signal in the M+1-th frame, it is impossible to correctly detect the motion region.

Accordingly, there is a case where the conventional motion detection circuit cannot correctly detect the motion region.

The present invention was made in view of the foregoing problem. An object of the present invention is to provide a motion detection device, a control program, and an integrated circuit, each capable of, with a simple configuration, correctly detecting a motion region in a moving image.

Solution to Problem

In order to solve the foregoing problem, a motion detection device of the present invention is a motion detection device which receives a signal indicative of a moving image constituted by temporarily consecutive frames and detects motion between the frames with respect to each block region consisting of one or a plurality of adjacent pixels constituting each frame, the motion detection device including: difference calculation means for calculating a difference signal indicative of a difference between adjacent two frames; first high frequency component calculation means for calculating, with respect to said each block region, a first high frequency component included in one of the two frames; second high frequency component calculation means for calculating, with respect to said each block region, a second high frequency component included in the other of the two frames; third high frequency component calculation means for calculating, with respect to said each block region, a third high frequency component by adding a product of the first high frequency component and a first coefficient to a product of the second high frequency component and a second coefficient; and division means for calculating, with respect to said each block region, a motion signal by dividing the difference signal by the third high frequency component, motion being detected when the motion signal in said each block region is larger than a predetermined threshold.

Furthermore, an integrated circuit of the present invention is an integrated circuit which receives a signal indicative of a moving image constituted by temporarily consecutive frames and detects motion between the frames with respect to each block region consisting of one or a plurality of adjacent pixels constituting each frame, the integrated circuit including: a difference calculation circuit for calculating a difference signal indicative of a difference between adjacent two frames; a first high frequency component calculation circuit for calculating, with respect to said each block region, a first high frequency component included in one of the two frames; a second high frequency component calculation circuit for calculating, with respect to said each block region, a second high frequency component included in the other of the two frames; a third high frequency component calculation circuit for calculating, with respect to said each block region, a third high frequency component by adding a product of the first high frequency component and a first coefficient to a product of the second high frequency component and a second coefficient; and a division circuit for calculating, with respect to said each block region, a motion signal by dividing the difference signal by the third high frequency component.

With the arrangements, the third high frequency component is calculated by adding a product of the high frequency component (edge component) included in one of the adjacent two frames and the first coefficient to a product of the high frequency component (edge component) included in the other of the adjacent two frames and the second coefficient. Then, the difference signal indicative of a difference between the adjacent two frames is divided by the third high frequency component to calculate a motion signal. When the motion signal in a certain block region is larger than the predetermined threshold, motion is detected in the block region.

Since the difference signal is divided by the third high frequency component calculated in consideration of high frequency components included in the adjacent two frames, respectively, it is possible to prevent division of the difference signal from generating a difference between a larger portion and a smaller portion of a signal value when a predetermined object moves at a constant speed in a screen.

Therefore, it is possible to detect a motion region more appropriately than a conventional art in which a difference signal is divided by a high frequency component included in one of adjacent two frames to calculate a motion signal.

Advantageous Effects of Invention

As described above, the motion detection device of the present invention is a motion detection device which receives a signal indicative of a moving image constituted by temporarily consecutive frames and detects motion between the frames with respect to each block region consisting of one or a plurality of adjacent pixels constituting each frame, the motion detection device including: difference calculation means for calculating a difference signal indicative of a difference between adjacent two frames; first high frequency component calculation means for calculating, with respect to said each block region, a first high frequency component included in one of the two frames; second high frequency component calculation means for calculating, with respect to said each block region, a second high frequency component included in the other of the two frames; third high frequency component calculation means for calculating, with respect to said each block region, a third high frequency component by adding a product of the first high frequency component and a first coefficient to a product of the second high frequency component and a second coefficient; and division means for calculating, with respect to said each block region, a motion signal by dividing the difference signal by the third high frequency component, motion being detected when the motion signal in said each block region is larger than a predetermined threshold.

Furthermore, the integrated circuit of the present invention is an integrated circuit which receives a signal indicative of a moving image constituted by temporarily consecutive frames and detects motion between the frames with respect to each block region consisting of one or a plurality of adjacent pixels constituting each frame, the integrated circuit including: a difference calculation circuit for calculating a difference signal indicative of a difference between adjacent two frames; a first high frequency component calculation circuit for calculating, with respect to said each block region, a first high frequency component included in one of the two frames; a second high frequency component calculation circuit for calculating, with respect to said each block region, a second high frequency component included in the other of the two frames; a third high frequency component calculation circuit for calculating, with respect to said each block region, a third high frequency component by adding a product of the first high frequency component and a first coefficient to a product of the second high frequency component and a second coefficient; and a division circuit for calculating, with respect to said each block region, a motion signal by dividing the difference signal by the third high frequency component.

Since the difference signal is divided by the third high frequency component calculated in consideration of high frequency components included in the adjacent two frames, respectively, it is possible to prevent division of the difference signal from generating a difference between a larger portion and a smaller portion of a signal value when a predetermined object moves at a constant speed in a screen.

Therefore, it is possible to detect a motion region more appropriately than a conventional art in which a difference signal is divided by a high frequency component included in one of adjacent two frames to calculate a motion signal.

For a fuller understanding of the nature and advantages of the invention, reference should be made to the ensuing detailed description taken in conjunction with the accompanying drawings.

BRIEF DESCRIPTION OF DRAWINGS

FIG. 1 is a block diagram showing a configuration of a motion detection device of the present invention.

Figure 1:
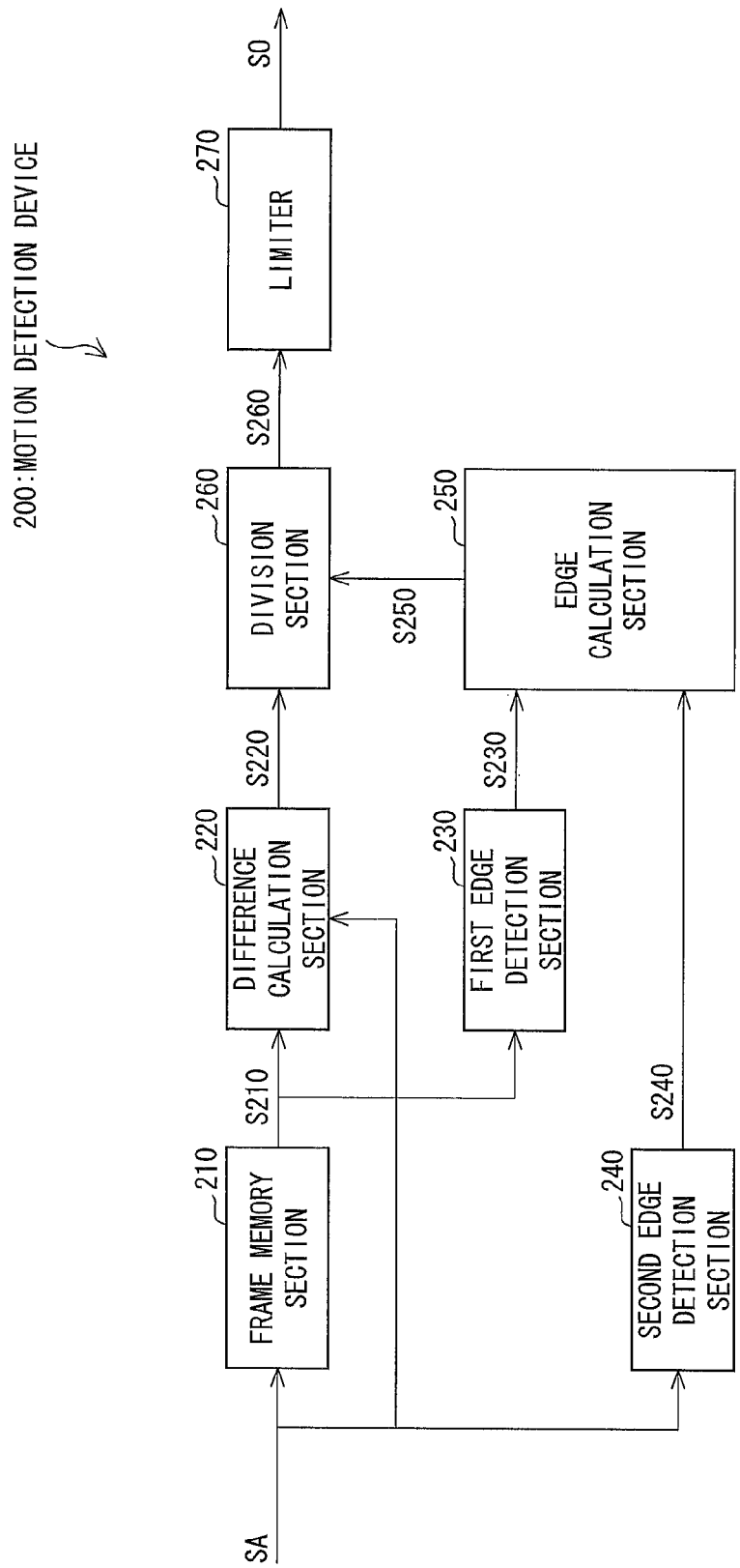
FIG. 1
Figure 2:
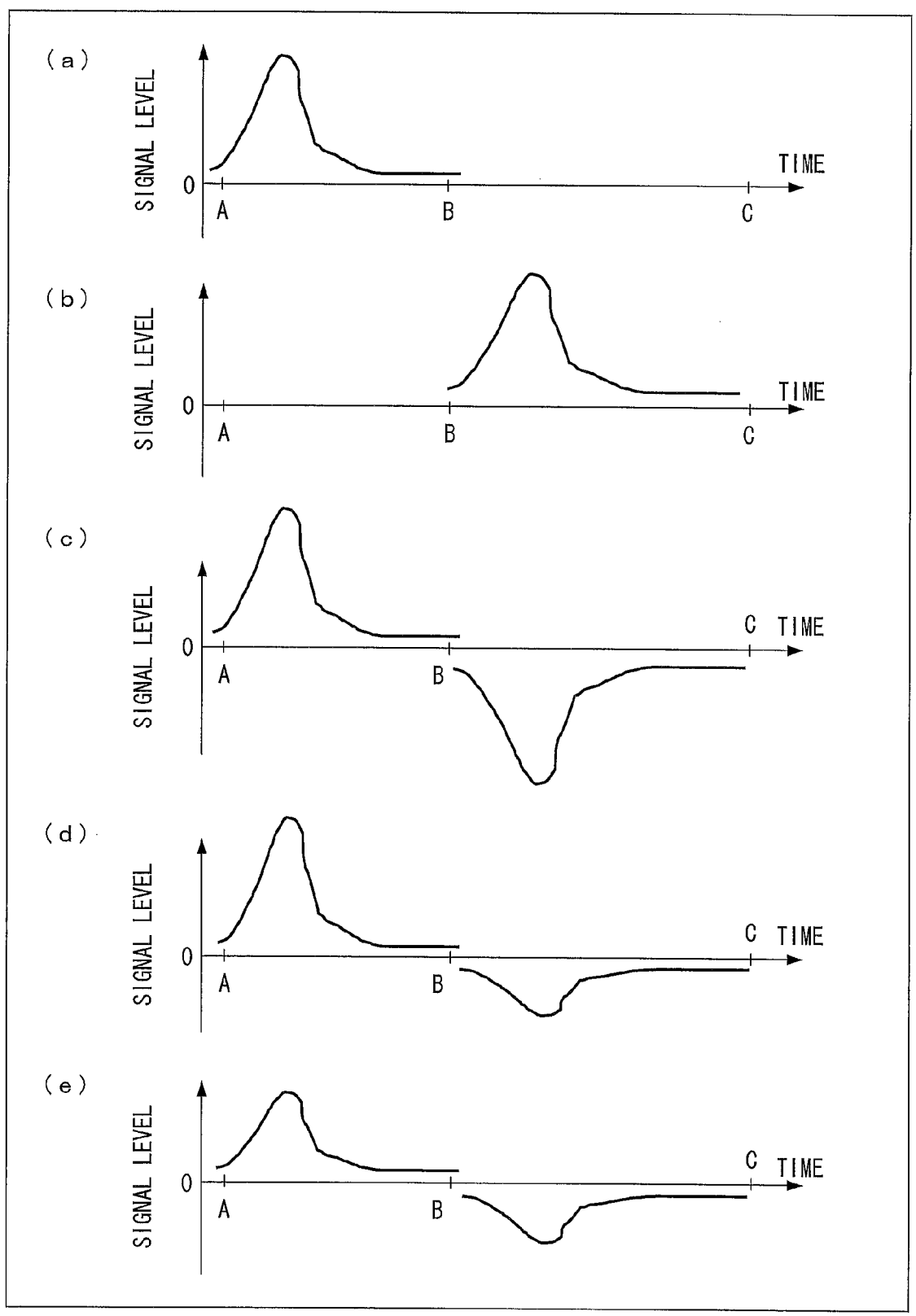
FIG. 2

(a) of FIG. 2 is a schematic view showing a waveform of a signal in an M-th frame. (b) of FIG. 2 is a schematic view showing a waveform of a signal in an M+1-th frame. (c) of FIG. 2 is a schematic view showing a difference (frame difference) between the signal shown in (a) of FIG. 2 and the signal shown in (b) of FIG. 2. (d) of FIG. 2 is a schematic view showing a waveform of a signal obtained by dividing the frame difference shown in (c) of FIG. 2 by the absolute value of an edge component in the M+1-th frame. (e) of FIG. 2 is a schematic view showing a waveform of a signal obtained by dividing the frame difference shown in (c) of FIG. 2 by an edge signal calculated by the motion detection device shown in FIG. 1.

FIG. 3

Figure 3:
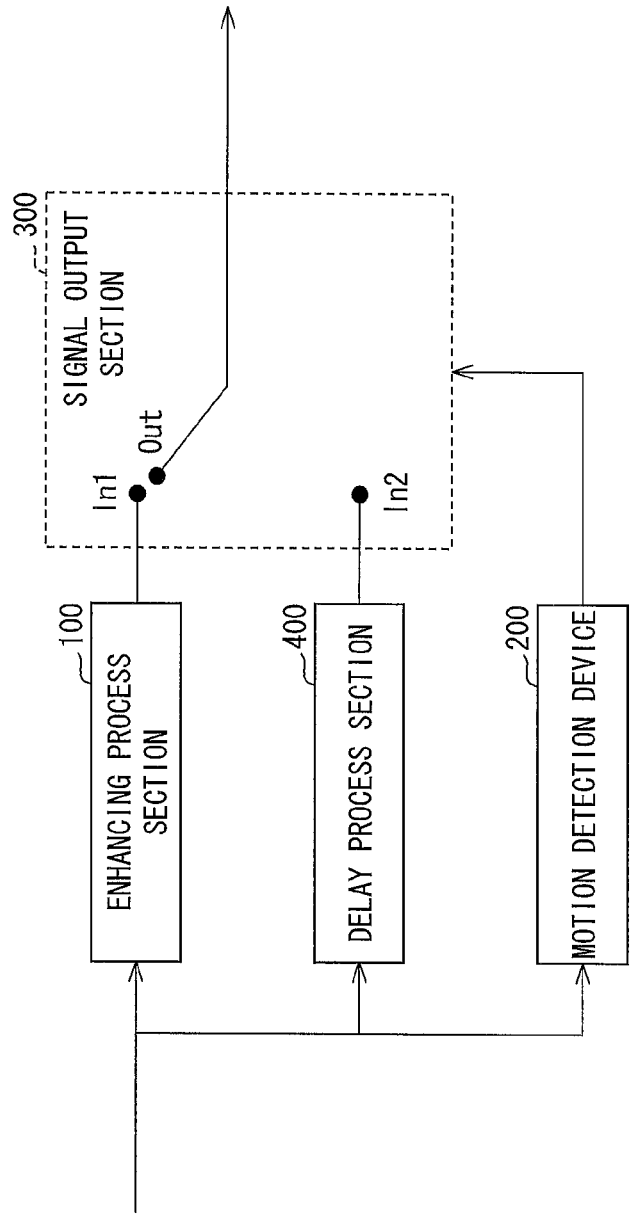

FIG. 3 is a block diagram showing a configuration of a signal processing device 500 including the motion detection device shown in FIG. 1.

FIG. 4

Figure 4:
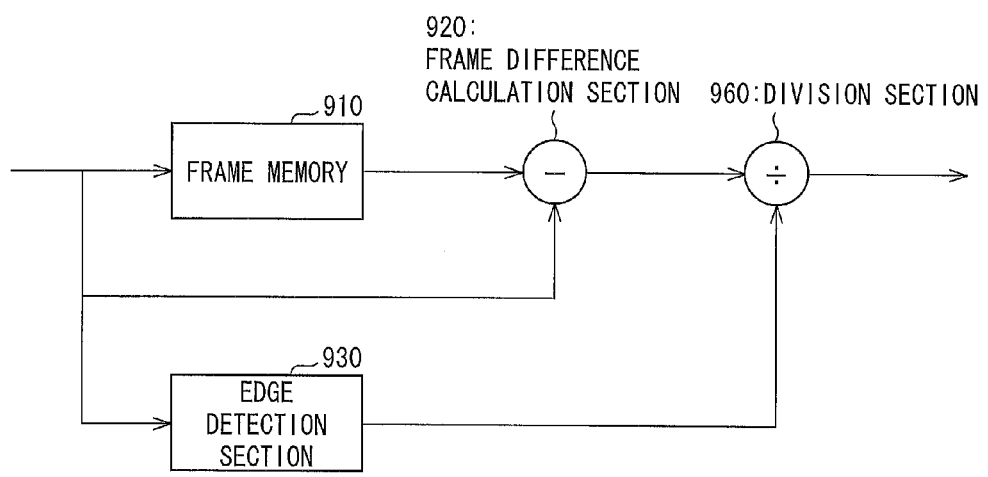

FIG. 4 is a block diagram showing a configuration of a conventional motion detection circuit.

FIG. 5

Figure 5:
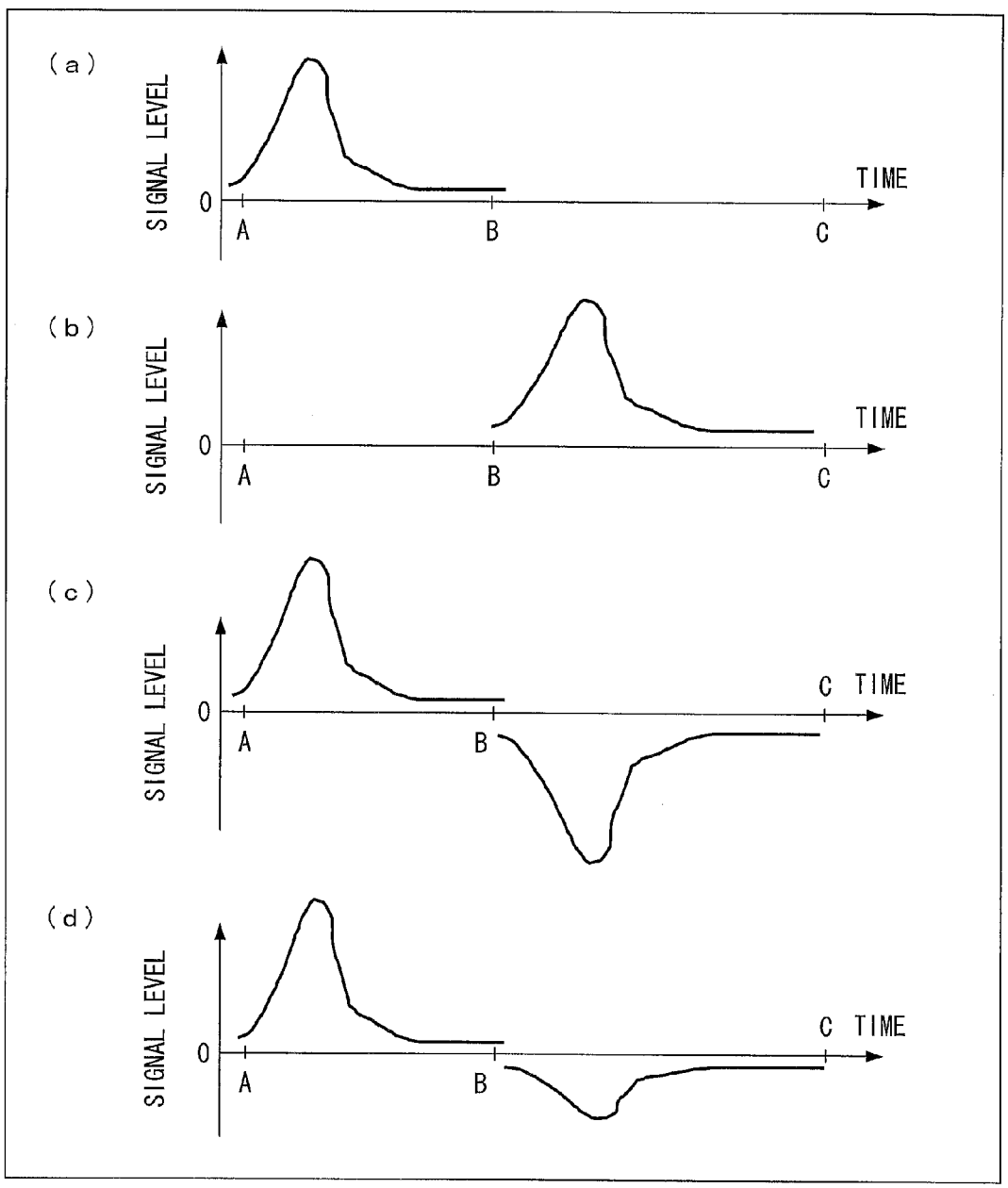

(a) of FIG. 5 is a schematic view showing a waveform in an M-th frame. (b) of FIG. 5 is a schematic view showing a waveform in an M+1-th frame. (c) of FIG. 5 is a schematic view showing a difference (frame difference) between the signal shown in (a) of FIG. 5 and the signal shown in (b) of FIG. 5. (d) of FIG. 5 is a schematic view showing a waveform obtained by dividing the frame difference shown in (c) of FIG. 5 by the absolute value of an edge component of the frame shown in (b) of FIG. 5.

DESCRIPTION OF EMBODIMENTS

The following explains an embodiment of the present invention with reference to FIGS. 1 to 3.

(Outline of Motion Detection Device)

Schematically, a motion detection device (integrated circuit) 200 in accordance with the present embodiment detects, with respect to each block region consisting of one or a plurality of adjacent pixels constituting a frame, motion between frames (screens) of a moving image constituted by a plurality of successive frames.

"Motion region" in the specification indicates a region where motion is observed between frames. The "motion region" may be all the regions which are not in stationary states, or may be only a region where motion is observed to some extent (motion amount is not less than a predetermined threshold).

Furthermore, the block region is preferably (1) a region consisting of 1 pixel or (2) a region consisting of 4 pixels×4 pixels (16 pixels), but not limited to them. Furthermore, it is not necessarily required to detect motion displayed by all pixels in a block region, and motion displayed by at least one pixel in the block region may be detected.

Hereinafter, a signal indicative of a moving image to be inputted to the motion detection device 200 is referred to as an input signal SA. An image signal outputted from the motion detection device 200 is referred to as an output signal SO.

A moving image indicated by the input signal SA is displayed in real time by a receiver of SDTV (Standard Definition Television), HDTV (High Definition Television) etc.

In the following, an explanation is made as to a case where the input signal SA is a data sequence (sequence of pixel values) consisting of pixel values of pixels positioned adjacently in a main scanning direction (horizontal direction, lateral direction) of an image. Alternatively, the input signal SA may be a data sequence consisting of pixel values of pixels positioned adjacently in a sub-scanning direction (vertical direction, longitudinal direction) of an image.

(Configuration of Motion Detection Device)

With reference to FIG. 1, the following explains a configuration of the motion detection device 200. FIG. 1 is a block diagram showing the configuration of the motion detection device 200.

As shown in the drawing, the motion detection device 200 includes at least a frame memory section 210, a difference calculation section (difference calculation means, difference calculation circuit) 220, a first edge detection section (first high frequency component calculation means, first high frequency component calculation circuit) 230, a second edge detection section (second high frequency component calculation means, second high frequency component calculation circuit) 240, an edge calculation section (third high frequency component calculation means, third high frequency component calculation circuit) 250, and a division section (division means, division circuit) 260. The motion detection device 200 may further include a limiter 270 as shown in the drawing.

The frame memory section 210 retains an input signal with respect to each frame, and outputs the retained signal to the difference calculation section 220 with respect to each frame. Consequently, the signal outputted from the frame memory section 210 indicates a frame immediately before the current frame. The signal outputted from the frame memory section 210 is referred to as a memory signal S210.

The difference calculation section 220 calculates a frame difference between a frame (current frame) indicated by the signal inputted to the motion detection device 200 and a frame which is indicated by the memory signal S210 and which is immediately before the current frame. The signal outputted from the difference calculation section 220 is referred to as a difference signal S220.

The first edge detection section 230 detects, with respect to each block region, a high frequency component (edge component) included in the immediately-before frame indicated by the memory signal S210. The first edge detection section 230 outputs the detected high frequency component as a first edge signal S230 (first high frequency component).

The second edge detection section 240 detects, with respect to each block region, a high frequency component (edge component) included in the current frame. The second edge detection section 240 outputs the detected high frequency component as a second edge signal S240 (second high frequency component).

The first edge detection section 230 and the second edge detection section 240 can be realized by a high pass filter etc. that allows a high frequency component to pass.

The edge calculation section 250 receives the first edge signal S230 and the second edge signal S240 and carries out predetermined calculation on the first edge signal S230 and the second edge signal S240 with respect to each block region, thereby obtaining an edge signal S250 (third high frequency component). Examples of the predetermined calculation include (A)-(D) below. The most preferable calculation is (A) below.

(A) At individual positions in the block region, one of the signal value of the first edge signal S230 and the signal value of the second edge signal S240 which one has a larger absolute value is regarded as a signal value of the edge signal S250 while retaining plus and minus signs thereof.

(B) At individual positions in the block region, a sum of a signal value of the first edge signal S230 and a signal value of the second edge signal S240 is regarded as a signal value of the edge signal S250.

(C) At individual positions in the block region, an average of a signal value of the first edge signal S230 and a signal value of the second edge signal S240 is regarded as a signal value of the edge signal S250.

(D) At individual positions in the block region, a weighted average of a signal value of the first edge signal S230 and a signal value of the second edge signal S240 is regarded as a signal value of the edge signal S250. That is, the signal value of S250 is {(signal value of S230×γ+signal value of S240×ε)/(γ+ε)} where γ and ε are any positive integers indicative of weight.

In other words, each of the calculations (A)-(D) is addition of a product of the signal value of the first edge signal S230 and a first coefficient (hereinafter coefficient P1) and a product of the signal value of the second edge signal S240 and a second coefficient (hereinafter coefficient P2) to calculate the signal value of the edge signal S250.

Specifically, the calculation (A) is an addition of the first edge signal S230×P1 and the second edge signal S240×P2 to calculate the edge signal S250 where P1=1 and P2=0 in a case the absolute value of the signal value of the first edge signal S230 is not less than the absolute value of the signal value of the second edge signal S240 and where P1=0 and P2=1 in a case the absolute value of the signal value of the first edge signal S230 is less than the absolute value of the signal value of the second edge signal S240.

The calculation (B) is an addition of the first edge signal S230×P1 and the second edge signal S240×P2 to calculate the edge signal S250 where P1=1 and P2=1.

The calculation (C) is an addition of the first edge signal S230×P1 and the second edge signal S240×P2 to calculate the edge signal S250 where P1=0.5 and P2=0.5.

The calculation (D) is an addition of the first edge signal S230×P1 and the second edge signal S240×P2 to calculate the edge signal S250 where P1={γ/(γ+ε)} and P2={ε/(γ+ε)}.

P1 and P2 are set by the edge calculation section 250 depending on which of the calculations (A)-(D) is employed.

It should be noted that since the edge signal S250 is used in division carried out by the division section 260, a predetermined value (e.g. "10") is always added to the calculated edge signal S250 for preventing division by zero.

The division section 260 divides the difference signal S220 by the edge signal S250 with respect to each block region. In other words, the difference signal S220 is normalized by the edge signal S250. Thus, a motion signal S260 indicative of a motion amount per block region is outputted. The reason why the motion amount can be calculated by dividing the frame difference by the edge component will be mentioned later. As the signal value of the motion signal S260 is larger, the motion amount is larger.

The limiter 270 changes a portion of the motion signal S260 which portion has smaller absolute value than a threshold TH to "0" (motionless). That is, the limiter 270 regards a block region whose motion amount has a smaller absolute value than the threshold TH as motionless (regards that no motion is detected in the block region). In other words, the limiter 270 regards that only a block region whose motion amount has not a smaller absolute value than the threshold TH exhibits motion (regards that motion is detected in the block region). The threshold TH may be set appropriately. In particular, the threshold TH is preferably set depending on which calculation is carried out by the edge calculation section 250.

(Reason Why Motion Amount can be Calculated by Dividing Frame Difference by Edge Component)

As described above, the motion detection device 200 divides the difference signal S220 by the edge signal S250. The following explains the reason why the motion signal S260 obtained by the division indicates a motion amount.

Initially, assume that a predetermined object at a position x of the screen during the M-th frame constituting a moving image moves by a distance a in a main scanning direction of the screen. M is any integer and the position x is any coordinate position on the screen. When a pixel value at the position x on the screen during the M-th frame is expressed as a function $P_M(x)$, a relation represented by an expression (1) below is met.

$$P_m(x) = P_{m+1}(x+a) \tag{1}$$

The right side member of the expression (1) can be developed into an expression (2) below by Taylor expansion.

$$P_{M+1}(x+a) = P_{M+1}(x) + \frac{a}{1!}P'_{M+1}(x) + \frac{a^2}{2!}P''_{M+1}(x) + \ldots \tag{2}$$

$$\approx P_{M+1}(x) + a \cdot P'_{M+1}(x)$$

Subsequently, $P_{M+1}(x)$ is subtracted from both side members of the expression (2) so that an expression (3) below is obtained.

$$P_{M+1}(x+a) - P_{M+1}(x) = a \cdot P'_{M+1}(x) \tag{3}$$

Subsequently, the expression (1) is assigned to the left side member of the expression (3) so that an expression (4) below is obtained.

$$P_M(x) - P_{M+1}(x) = a \cdot P'_{M+1}(x) \tag{4}$$

Subsequently, both side members of the expression (4) are divided by $P'_{M+1}(x)$ so that an expression (5) below is obtained.

$$\frac{P_M(x) - P_{M+1}(x)}{P'_{M+1}(x)} = a \tag{5}$$

Here, since $P'_{M+1}(x)$ indicates an edge of the position x in the M+1-th frame, the left side member of the expression (5) is a division of "difference in pixel value at position x between M-th frame and M+1-th frame" by "edge at position x in M+1-th frame". On the other hand, the right side member of the expression (5) is a distance a indicative of a motion amount.

Therefore, by dividing the frame difference by the edge component, it is possible to calculate the motion amount. Since the frame difference is normalized by division by the edge component, it is possible to calculate the motion amount regardless of the amount of the frame difference.

(Reason Why Two Edge Components are Used in Calculation)

As described above, in the motion detection device 200, the first edge detection section 230 detects an edge component in the M+1-th frame and the second edge detection section 240 detects an edge component in the M-th frame. Then, the edge calculation section 250 calculates the edge signal S250 by using the signal values of the first edge signal S230 and the second edge signal S240. Thereafter, the division section 260 divides the difference signal S220 by the edge signal S250.

With reference to FIG. 2, the following explains why the frame difference is divided by the edge signal S250 which is calculated from the edge components in the M-th frame and the M+1-th frame.

(a) of FIG. 2 is a schematic view showing a waveform of a signal in the M-th frame. (b) of FIG. 2 is a schematic view showing a waveform of a signal in the M+1-th frame. It is assumed that a predetermined object moves at a constant speed in a screen without changing its shape from the M-th frame shown in (a) of FIG. 2 to the M+1-th frame shown in (b) of FIG. 2. (c) of FIG. 2 is a schematic view showing a difference (frame difference) between the signal shown in (a) of FIG. 2 and the signal shown in (b) of FIG. 2.

As described in the Background Art section, when the frame difference shown in (c) of FIG. 2 is divided by only the edge component in the M+1-th frame, the waveform shown in (d) of FIG. 2 is obtained for example. In this case, in the signal whose frame difference is shown in (c) of FIG. 2, a portion resulting from the signal during the M+1-th frame (signal in a zone from B to C in the drawing) has s smaller signal value by the division, whereas a portion resulting from the signal during the M-th frame (signal in a zone from A to B in the drawing) does not have a smaller signal value by the division because the portion does not have an edge component of the frame during the M+1-th frame. Consequently, as a result of the division, there exist both the portion with a large signal value and the portion with a small signal value in the motion signal S260 obtained by the division. In this case, as described in the Background Art section, although an identical predetermined object moves, there may appear a frame difference between the portion with a large signal value and the portion with a small signal value, resulting in incorrect detection of a moving region.

In order to deal with this problem, the frame difference shown in (c) of FIG. 2 is divided not by the edge component in the M+1-th frame only, but by the edge signal S250 calculated from the edge component in the M-th frame and the edge component in the M+1-th frame.

How to calculate the edge signal S250 has been already described above. In particular, it is preferable that a larger one of the signal value of the first edge signal S230 and the signal value of the second edge signal S240 is regarded as the signal value of the edge signal S250.

By dividing the frame difference shown in (c) of FIG. 2 by the edge signal S250 thus calculated, a waveform shown in (e) of FIG. 2 for example is obtained. Consequently, in the motion signal S260, the portion resulting from the signal in the M-th frame and the portion resulting from the signal in the M+1-th frame can be substantially identical with each other.

In this case, the motion signal S260 can have an identical level or similar levels regardless of the luminance level of the predetermined object.

Therefore, the motion detection device 200 can correctly detect the motion region.

It should be noted that merely calculating the frame difference does not allow correct detection of a motion region. This is explained below using a case where luminance data of an image is an 8-bit digital signal as an example. In this case, a luminance value is between 0 and 255. Here, a case where an object with a luminance value of "10" moves by 5 pixels per frame and a case where an object with a luminance value of "100" moves by 5 pixels per frame exhibit different frame differences but exhibit an identical motion amount of 5 pixels per frame. However, when the frame difference is simply regarded as a motion amount, the case where the object with a larger luminance value exhibits a larger motion signal. That is, the motion amount of the object with a luminance value of "100" is 10 times larger than the motion amount of the object with a luminance value of "10".

(Example of Application of Motion Detection Device)

Next, with reference to FIG. 3, an explanation is made as to an example of application of the motion detection device 200. FIG. 3 is a block diagram showing a configuration of a signal processing device 500 including the motion detection device 200. Schematically, the signal processing device 500 is a device for enhancing a motion region of a moving image (enhancer).

As shown in the drawing, the signal processing device 500 includes, in addition to the motion detection device 200, an enhancing process section 100, a signal output section 300, and a delay process section 400.

The enhancing process section 100 subjects a signal indicative of a moving image inputted to the signal processing device 500 to an enhancing process for enhancing a signal waveform, and outputs the enhanced signal. The enhancing process is a process for sharpening rising and falling of an input signal. In particular, the enhancing process sharpens rising and falling of a signal which correspond to an outline portion (edge) in the image. The configuration of the enhancing process section 100 is not particularly limited and may be a generally known one.

The motion detection device 200 detects a motion of each block region in a moving image indicated by a signal inputted to the signal processing device 500. Here, it is assumed that the result of detection is supplied to the signal output section 300.

The signal output section 300 is a switch for alternately connecting a connection point Out with a connection point In1 and a connection point In2. Specifically, when the motion detection device 200 detects a motion, the signal output section 300 connects the connection point Out with the connection point In1. On the other hand, when the motion detection device 200 does not detect a motion, the signal output section 300 connects the connection point Out with the connection point In2.

The delay process section 400 is a delay circuit for adjusting timing between a signal inputted to the signal processing device 500 and a signal outputted from the enhancing process section 100, and includes a delay element.

With the above arrangement, with respect to a block region where a motion is detected by the motion detection device 200, the signal output section 300 outputs a signal from the enhancing process section 100 as an output signal. On the other hand, with respect to a block region where no motion is detected by the motion detection device 200, the signal output section 300 outputs a signal inputted to the signal processing device 500 as an output signal without any modification.

With the arrangement, the signal processing device 500 carries out the enhancing process on a motion region in a moving image. This gives feeling that a resolution of the moving image is increased.

(Additional Note)

Finally, the blocks of the motion detection device 200 may be realized by hardware by using a logic circuit on an integrated circuit (IC chip or by software by using CPUs (central processing unit) as follows.

In a case of realizing by software, the motion detection device 200 include: CPUs (central processing unit) for executing a control program for realizing each function; ROMs (read only memory) that store the program; RAMs (random access memory) that develop the program; storage devices (storage mediums) such as memories that store the program and various data; and the like. The object of the present invention can be realized in such a manner that the motion detection device 200 is provided with a computer-readable storage medium for storing program codes (such as executable program, intermediate code program, and source program) of programs of the motion detection device 200 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a floppy disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM, or logic circuits such as PLD (Programmable logic device).

Further, the motion detection device 200 may be arranged so as to be connectable to a communication network so that the program code is supplied to the motion detection device 200 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR (High Data Rate), NFC (Near Field Communication), DLNA (Digital Living Network Alliance), mobile phone network, satellite connections, and terrestrial digital network.

As described above, in the present specification, means does not necessarily indicate physical means, and includes a case where the functions of individual means are realized by software. Furthermore, the function of one means may be realized by two or more physical means, or the functions of two or more means may be realized by one physical means.

As described above, the motion detection device of the present invention is a motion detection device which receives a signal indicative of a moving image constituted by temporarily consecutive frames and detects motion between the frames with respect to each block region consisting of one or a plurality of adjacent pixels constituting each frame, the motion detection device including: difference calculation means for calculating a difference signal indicative of a difference between adjacent two frames; first high frequency component calculation means for calculating, with respect to said each block region, a first high frequency component included in one of the two frames; second high frequency component calculation means for calculating, with respect to said each block region, a second high frequency component included in the other of the two frames; third high frequency component calculation means for calculating, with respect to said each block region, a third high frequency component by adding a product of the first high frequency component and a first coefficient to a product of the second high frequency component and a second coefficient; and division means for calculating, with respect to said each block region, a motion signal by dividing the difference signal by the third high frequency component, motion being detected when the motion signal in said each block region is larger than a predetermined threshold.

Furthermore, the integrated circuit of the present invention is an integrated circuit which receives a signal indicative of a moving image constituted by temporarily consecutive frames and detects motion between the frames with respect to each block region consisting of one or a plurality of adjacent pixels constituting each frame, the integrated circuit including: a difference calculation circuit for calculating a difference signal indicative of a difference between adjacent two frames; a first high frequency component calculation circuit for calculating, with respect to said each block region, a first high frequency component included in one of the two frames; a second high frequency component calculation circuit for calculating, with respect to said each block region, a second high frequency component included in the other of the two frames; a third high frequency component calculation circuit for calculating, with respect to said each block region, a third high frequency component by adding a product of the first high frequency component and a first coefficient to a product of the second high frequency component and a second coefficient; and a division circuit for calculating, with respect to said each block region, a motion signal by dividing the difference signal by the third high frequency component.

Since the difference signal is divided by the third high frequency component calculated in consideration of high frequency components included in the adjacent two frames, respectively, it is possible to prevent division of a difference signal from generating a difference between a larger portion and a smaller portion of a signal value when a predetermined object moves at a constant speed in a screen.

Therefore, it is possible to detect a motion region more appropriately than a conventional art in which a difference signal is divided by a high frequency component included in one of adjacent two frames to calculate a motion signal.

The motion detection device of the present invention may be arranged such that in a case where an absolute value of the first high frequency component is equal to or larger than an absolute value of the second high frequency component, the third high frequency component calculation means sets the first coefficient to 1 and sets the second coefficient to 0, and in a case where the absolute value of the first high frequency component is smaller than the absolute value of the second high frequency component, the third high frequency component calculation means sets the first coefficient to 0 and sets the second coefficient to 1.

With the arrangement, out of the high frequency component (edge component) included in one of adjacent two frames and the high frequency component (edge component) included in the other of the adjacent two frames, the one with a larger absolute value can be the third high frequency component while maintaining its positive and negative signs.

The motion detection device of the present invention may be arranged such that the third high frequency component calculation means sets the first coefficient and the second coefficient to values between 0 and 1 so that a sum of the first coefficient and the second coefficient is 1.

With the arrangement, the third high frequency component can be calculated by adding a multiple of the high frequency component included in one of adjacent two frames with $\{\gamma/(\gamma+\epsilon)\}$ to a multiple of the high frequency component included in the other of the adjacent two frames with $\{\epsilon/(\gamma+\epsilon)\}$. $\gamma$ and $\epsilon$ are any positive integers indicative of weight.

The motion detection device of the present invention may be arranged such that the third high frequency component calculation means sets the first coefficient and the second coefficient to 0.5.

With the arrangement, the third high frequency component can be calculated as an average of the high frequency component (edge component) included in one of adjacent two frames and the high frequency component (edge component) included in the other of the adjacent two frames.

The motion detection device of the present invention may be arranged such that the third high frequency component calculation means sets the first coefficient and the second coefficient to 1.

With the arrangement, the third high frequency component can be calculated as a sum of the high frequency component (edge component) included in one of adjacent two frames and the high frequency component (edge component) included in the other of the adjacent two frames.

The motion detection device may be realized by a computer. In this case, the present invention also encompasses a control program for the motion detection device which causes a computer to operate as the means of the motion detection device to realize the motion detection device by the computer, and a computer-readable storage medium in which the control program is stored.

Furthermore, a chip including the aforementioned integrated circuit is also encompassed in the present invention.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

The present invention is applicable to a signal processing device which processes a digital signal indicative of a moving image. In particular, the present invention is preferably applicable to an enhancing processing device (enhancer) etc. for enhancing a moving image.

REFERENCE SIGNS LIST

200 Motion detection device (integrated circuit)
220 Difference calculation section (difference calculation means, difference calculation circuit)
230 First edge detection section (first high frequency component calculation means, first high frequency component calculation circuit)
240 Second edge detection section (second high frequency component calculation means, second high frequency component calculation circuit)
250 Edge calculation section (third high frequency component calculation means, third high frequency component calculation circuit)
260 Division section (division means, division circuit)
S220 Difference signal
S230 First edge signal (first high frequency component)
S240 Second edge signal (second high frequency component)
S250 Edge signal (third high frequency component)
S260 Motion signal
P1 First coefficient
P2 Second coefficient

The invention claimed is:

1. A motion detection device, which receives a signal indicative of a moving image constituted by temporarily consecutive frames and detects motion between the frames with respect to each block region consisting of one or a plurality of adjacent pixels constituting each frame,
the motion detection device comprising:
difference calculation means for calculating a difference signal indicative of a difference between adjacent two frames;
first high frequency component calculation means for calculating, with respect to said each block region, a first high frequency component included in one of the two frames;
second high frequency component calculation means for calculating, with respect to said each block region, a second high frequency component included in the other of the two frames;
third high frequency component calculation means for calculating, with respect to said each block region, a third high frequency component by adding a product of the first high frequency component and a first coefficient to a product of the second high frequency component and a second coefficient; and
division means for calculating, with respect to said each block region, a motion signal by dividing the difference signal by the third high frequency component,
motion being detected when the motion signal in said each block region is larger than a predetermined threshold.

2. The motion detection device as set forth in claim 1, wherein
in a case where an absolute value of the first high frequency component is equal to or larger than an absolute value of the second high frequency component, the third high frequency component calculation means sets the first coefficient to 1 and sets the second coefficient to 0, and
in a case where the absolute value of the first high frequency component is smaller than the absolute value of the second high frequency component, the third high frequency component calculation means sets the first coefficient to 0 and sets the second coefficient to 1.

3. The motion detection device as set forth in claim 1, wherein the third high frequency component calculation means sets the first coefficient and the second coefficient to values between 0 and 1 so that a sum of the first coefficient and the second coefficient is 1.

4. The motion detection device as set forth in claim 3, wherein the third high frequency component calculation means sets the first coefficient and the second coefficient to 0.5.

5. The motion detection device as set forth in claim 1, wherein the third high frequency component calculation means sets the first coefficient and the second coefficient to 1.

6. A control program for causing a computer in a motion detection device as set forth in claim 1 to operate as the means of the motion detection device.

7. An integrated circuit, which receives a signal indicative of a moving image constituted by temporarily consecutive frames and detects motion between the frames with respect to each block region consisting of one or a plurality of adjacent pixels constituting each frame,
the integrated circuit comprising:
a difference calculation circuit for calculating a difference signal indicative of a difference between adjacent two frames;
a first high frequency component calculation circuit for calculating, with respect to said each block region, a first high frequency component included in one of the two frames;
a second high frequency component calculation circuit for calculating, with respect to said each block region, a second high frequency component included in the other of the two frames;
a third high frequency component calculation circuit for calculating, with respect to said each block region, a third high frequency component by adding a product of the first high frequency component and a first coefficient to a product of the second high frequency component and a second coefficient; and
a division circuit for calculating, with respect to said each block region, a motion signal by dividing the difference signal by the third high frequency component.

* * * * *